United States Patent [19]
Hoffman et al.
[11] 3,810,124
[45] May 7, 1974

[54] MEMORY ACCESSING SYSTEM

[75] Inventors: William K. Hoffman, Shelburne; Albert Y. Kao, Essex Junction, both of Vt.

[73] Assignee: International Business Machines Corporation, Armonk, N.Y.

[22] Filed: June 30, 1972

[21] Appl. No.: 267,805

[52] U.S. Cl. .......... 340/173 R
[51] Int. Cl. .......... G11c 11/40
[58] Field of Search .... 340/173 CA, 173 R, 173 FF; 307/303; 317/235 G

[56] References Cited

UNITED STATES PATENTS 3,706,978 12/1972 Dailey et al. .......... 340/173 R
3,706,977 12/1972 Dailey et al. .......... 340/173 FF

*Primary Examiner*—James W. Moffitt
*Attorney, Agent, or Firm*—Stephen J. Limanek

[57] ABSTRACT

A system for accessing a memory line coupled to a plurality of aligned memory cells has only a decode circuit and means for applying a drive pulse coupled to one end of the line, the other end of the line is connected to a pulldown circuit which provides a low impedance path to ground unless it is overdriven by the drive pulse. The drive pulse is applied only to a line selected by the decode circuit.

16 Claims, 3 Drawing Figures

MEMORY ACCESSING SYSTEM

CROSS-REFERENCE TO RELATED APPLICATION

Application Ser. No. 76,878 filed on Sept. 30, 1970, by James K. Picciano and Joseph Zauchner and assigned to International Business Machines Corporation.

BACKGROUND OF THE INVENTION

1. Field of the Invention

This invention relates to an accessing system for a random access memory formed in an integrated circuit structure, such as in a semiconductor chip having a high density of very small memory cells aligned in a plurality of parallel rows.

2. Description of the Prior Art

Random access memories formed in semiconductor, such as silicon, chips now have highly dense cells occupying very small surface areas on the chips. These cells, each of which may include only one capacitor and one active element, are arranged in rows and columns and are accessed by perpendicularly disposed word and bit lines coupled to the cells, as disclosed in, e.g., commonly owned U.S. Pat. No. 3,387,286, granted to R. H. Dennard on June 4, 1968.

To select a desired line, e. g., a word line, a decode circuit, to which are connected a plurality of address lines, is used for providing an address pulse for the desired line, as described more fully in, e. g., the above-identified copending commonly assigned U.S. application Ser. No. 76,878. In order to eliminate or minimize noise in the memory array it is preferred that the word lines of the memory be connected to ground or a point of reference potential through low impedance switches, or pull-down circuits, except for the period of time when the line is selected by the decode circuit. Grounding switches providing low impedance paths in a memory system except during actual write-in and read-out operations are described in U.S. Pat. No. 3,510,856.

In view of the extremely small cell sizes and the resultant decreased pitch of the word lines, it has become difficult to efficiently utilize chip space for the decode circuits and the drive pulse circuits and pull-down circuits, which are controlled by the decode circuits, when they are all coupled to one end of the word line. It is desired to have these accessing circuits of the same pitch as and aligned with the memory line and associated cells so as to eliminate the need for long connecting lines between a memory line and its corresponding accessing or support circuitry. Of course, the pitch of the support circuitry for a series of interconnected cells may be maintained equal to the pitch of these cells by utilizing an elongated support circuitry area, however, such a geometry has been found to be inefficient for laying out the support circuits themselves, and burdensome. With memory cells of continuously decreasing size being developed, the density and number of memory cells on a chip is becoming limited by the support circuitry required on the chip.

SUMMARY OF THE INVENTION

Accordingly, it is an object of this invention to provide more efficient use of the surface area of a semiconductor chip.

It is another object of this invention to provide a large number and a high density of memory cells in a semiconductor chip which is not limited by the size or pitch of the accessing or support circuitry.

It is a further object of this invention to locate a pull-down circuit in a memory accessing system so that it does not add to the size of the pitch of the accessing circuitry of a memory cell.

It is yet another object of this invention to maintain an accessing circuitry pitch equal to its cell pitch by locating portions of the accessing circuitry in two separate areas on a chip without providing an additional line or conductor to interconnect these portions.

In accordance with this invention, a memory accessing system is provided which includes a plurality of aligned cells interconnected by a drive line having a first circuit including means for producing a drive pulse coupled to one end of the line and a second circuit responsive to the drive pulse coupled to the other end of the line. The first circuit may include a decode circuit and a drive pulse circuit controlled by the decode circuit and the second circuit may include a pull-down circuit providing a low impedance path to ground from the other end of the line unless it receives a drive pulse from the drive line. By locating a pull-down circuit, responsive to the drive pulse, at the other end of the line, considerable flexibility and efficiency in the layout of the memory on the semiconductor chip is realized, particularly since an additional conductive line is not required from the decode circuit to control the pull-down circuit.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Figure 1:
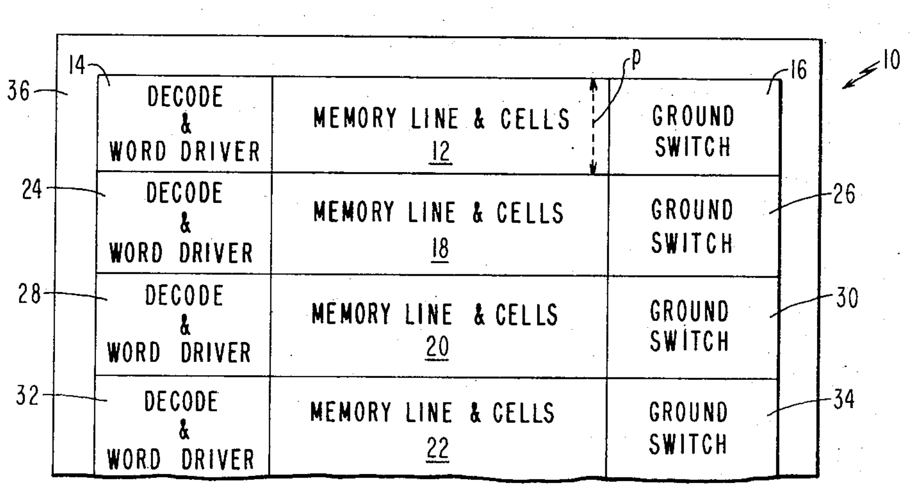
FIG. 1 illustrates the layout of a memory chip in accordance with the invention.

Referring to the drawing in more detail, there is shown in FIG. 1 a layout of a memory on a silicon chip 10 in accordance with the present invention. Elements of a memory line and of memory cells coupled to the line are formed in the silicon chip 10, by known techniques, in elongated area 12 having a pitch *p*. Word driver and decode circuitry associated with the memory line and cell area 12 is provided in chip area 14, also having a pitch *p*, adjacent to and at one end of the memory line and cell area 12. Elements of ground switch or pull-down circuitry are located in the silicon chip 10 in chip area 16, again having a pitch *p*, adjacent to the memory line and cell area 12 but at the opposite end of the memory line and cell area 12. Accordingly, it can be seen that the accessing circuitry, i. e., the decode, word driver and ground switch, for the memory line and cells in area 12 is conveniently located at both ends of the line and cell area 12 within the single pitch *p*. Other memory lines and cells on the chip 10, such as may be provided in areas 18, 20 and 22 also have associated accessing circuitry in areas 24 and 26, 28 and 30, and 32 and 34, respectively, each having a pitch *p*. The area 36 at the periphery of chip 10 is used for required pad and bus connections to circuits outside of chip 10. It can be seen that this memory arrangement provides a very uniform and efficient layout of the surface of the chip 10.

Figure 2:
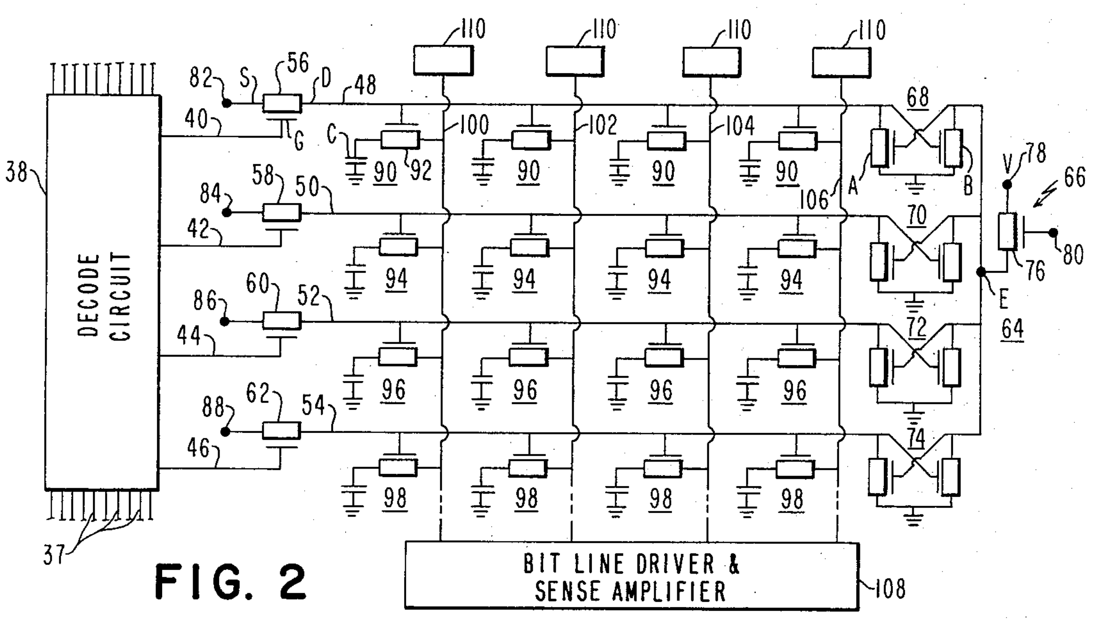
FIG. 2 shows a memory array and accessing circuitry of an embodiment of the present invention, and FIG. 3 indicates a pulse program used in the operation of the embodiment shown in FIG. 2.

FIG. 2 shows in some detail the circuitry of an embodiment of a memory accessing system of the present invention enjoying the layout illustrated in FIG. 1. Address lines 37 are connected to a decode circuit 38 which has four output lines 40, 42, 44, and 46 coupled to one end of memory word lines 48, 50, 52, and 54, respectively, through corresponding field effect transistors (FET's) 56, 58, 60, and 62. Each of these transistors has a gate G and source and drain current electrodes S and D. The other end of each of the word lines 48, 50, 52, and 54 is connected to a pull-down circuit 64 having restore pulse means 66 and latches 68, 70, 72, and 74. Each of the latches has two FET's A and B and the restore pulse means 66 includes an FET 76, a first terminal 78 connected to a current carrying electrode of FET 76 to which is applied a voltage V and a second terminal 80 connected to the gate of FET 76 to which is applied a pulse for turning on FET 76. Terminals 82, 84, 86, and 88 are connected to current carrying electrodes of FET's 56, 58, 60, and 62, respectively, for applying through these FET's under the control of the decode circuit 38, word drive pulses to corresponding word lines 48, 50, 52, and 54. A first plurality of memory cells 90 each having a capacitor C connected to one current carrying electrode of a transistor 92 is coupled to the word line 48 by connecting the word line 48 to the gate of transistor 92. A second plurality of similar cells 94 is coupled to word line 50, and third and fourth pluralities of cells 96 and 98 are coupled to word lines 52 and 54, respectively. Memory cells 90, 94, 96, and 98 are also coupled to bit/sense lines 100, 102, 104, and 106 by connecting the bit/sense line to the other current carrying electrode of the FET 92. The bit/sense lines 100, 102, 104, and 106 may be connected at one end to any appropriate known bit line driver and sense amplifier 108 and at the end to suitable terminators 110 which may be a ground or other suitable point of reference potential, a characteristic impedance or a source of energy.

Figure 3:
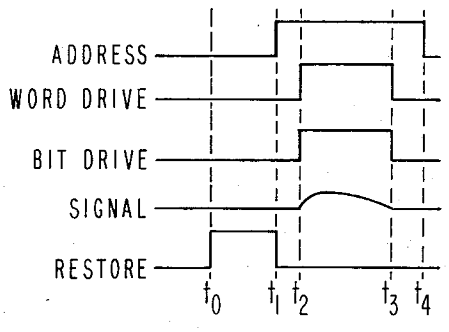

The pulse program shown in FIG. 3 is used in the operation of the embodiment of the invention shown in FIG. 2. A restore pulse is applied to terminal 80 of pull-down circuit 64 at time $t_0$ to precharge a node E to turn on each FET A of latches 68, 70, 72, and 74 to provide a path to ground from each of the word lines 48, 50, 52, and 54. At time $t_1$, an address pulse from decode circuit 38, which has been selected by address lines 37, is applied to FET's 56, 58, 60, and 62 to turn on each of these FET's, and the restore pulse is turned off. At time $t_2$, a word drive pulse is applied only to, e. g., terminal 82, by for example other known decoding means operating at another decoding level, not shown. This pulse passes through word line 48 to the gate of FET B of latch 68 which turns on FET B to discharge node E. Since node E is discharged, FET A turns off providing a high impedance to word line 48 and allowing word line 48 to attain a predetermined voltage value. The discharge of node E also turns off the FET A of each of the other latches 70, 72, and 74. However, since word lines 50, 52, and 54 were not selected and the FET's 58, 60, and 62 are turned on by the address pulse, terminals 84, 86, and 88 remain connected to ground through conventional circuitry, not shown, to maintain unselected word lines 50, 52, and 54 at or near ground potential.

To write information, for example, a "1", into a desired memory cell 90, e. g., the cell coupled to both word line 48 and bit/sense line 100, a bit drive pulse from bit line driver 108 is applied to bit/sense line 100 simultaneously with the application of the word drive pulse to charge capacitor C of cell 90, as described more fully in the above-identified R. H. Dennard patent. In order to read-out the information from this selected cell 90 a word drive pulse is applied to the gate of FET 92 from the word line 48 to produce a current signal in bit/sense line 100 which is amplified in sense amplifier 108. Word drive pulses and bit drive pulses, when used, terminate at time $t_3$ and the pulse cycle ends at time $t_4$ with the termination of the address pulse. A new cycle then begins with restore pulse at time $t_0$.

It should be understood that the width to length ratio of the FET's 56, 58, 60, and 62 with respect to that of the FET's A of latches 68, 70, 72, and 74 is a trade off between speed and power. An initial current will flow through FET A of the latch of the selected line depending upon its size, until the node E in the pull-down circuit 64 is discharged. This amount of current has been found to be quite insignificant. It should also be understood that although a one-out-of-four decode array scheme has been illustrated in FIG. 2, the invention also may be used in a one-to-one arrangement. In a one-to-one arrangement, a word drive pulse is applied to each of the terminals 82, 84, 86, and 88, but since only one of the FET's 56, 58, 60, and 62 has an address pulse applied to its gate to turn on that FET, only one word line will receive a word pulse. In the one-to-one arrangement a separate restore pulse means would, of course, have to be provided with each latch. By coupling the pull-down circuit 64 to the end of the word lines 48, 50, 52, and 54 opposite the end to which the decode circuit and the drive pulse circuit are connected, the layout of the chip can be more uniform and efficient, since the pitch of the accessing or support circuits is equal to the pitch of the memory cell. A reduction in chip area of approximately 20 percent has been noted when using the present invention over prior art layouts. Consequently, the density of the memory cells in a semiconductor is not support circuit limited when using the teachings of the present invention.

While the invention has been particularly shown and described with reference to the preferred embodiment thereof, it will be understood by those skilled in the art that various changes in form and details of the apparatus and method may be made therein without departing from the spirit and scope of the invention and that the method is in no way restricted by the apparatus.

What is claimed is:

1. A memory accessing system comprising a plurality of word drive lines, means for applying a drive pulse to one end of said drive lines, a decode circuit having a plurality of outputs coupled to the one end of said drive lines for controlling the application of said drive pulse to said drive lines, and a pull-down circuit having a plurality of latches connected to the other end of said drive lines and responsive to said drive pulse to set said latches in a first state and means for applying a restore pulse at predetermined periodic intervals to said latches to set said latches in a second state.

2. A memory system comprising a word line having a normally capacitive impedance, a plurality of bit/sense lines, a plurality of memory cells each coupled to said word line at spaced apart points and to one of said bit/sense lines for applying signals to said cells during data time intervals, a first circuit including means for producing drive pulses during said data time intervals coupled to one end of said word line, and a second circuit coupled to the other end of said word line and having first and second states, said first state being a low resistive impedance state and said second state being a high capacitive impedance state, said second circuit including a restore circuit and means for applying pulses to said restore circuit at predetermined periodic intervals outside of said data time intervals to establish said second circuit in said first state, and said second circuit being responsive to said drive pulses for switching said second circuit to said high capacitive impedance state.

3. A memory system as set forth in claim 2 wherein one of said predetermined periodic intervals precedes each of said data time intervals and said second circuit in said first state connects said word line to ground during said predetermined periodic intervals.

4. A memory system as set forth in claim 3 wherein each of said memory cells includes a field effect transistor having a gate electrode coupled to said word time and a current carrying electrode coupled to one of said bit/sense lines.

5. A memory system comprising a plurality of memory cells, a memory line coupled to each of said cells at spaced apart points normally forming a capacitive impedance with said cells, a first circuit including means for producing drive pulses coupled to one end of said memory line, and a second circuit coupled to the other end of said line and having first and second states, said first state being a low resistive impedance state and said second state being a high capacitive impedance state, said second circuit including a restore circuit and means for applying pulses to said restore circuit at predetermined periodic intervals to establish said second circuit in said first state, and said second circuit being responsive to said drive pulses for switching said second circuit to said high capacitive impedance state.

6. A memory system as set forth in claim 5 wherein each of said cells includes a field effect transistor having a gate electrode coupled to said memory line.

7. A memory system as set forth in claim 5 wherein said first circuit includes a decode circuit and said second circuit includes a pull-down circuit.

8. A memory accessing system as set forth in claim 7 wherein said pull-down circuit is a latch.

9. A memory system as set forth in claim 5 wherein said second circuit in said first state connects said memory line to a point of reference potential.

10. A memory system as set forth in claim 9 wherein said point of reference potential is ground.

11. A memory accessing system comprising a semiconductor chip, a plurality of memory cells aligned in said chip and having a given pitch, a drive line interconnecting said plurality of cells, a decode circuit and means for applying a drive pulse coupled to one end of said drive line and formed within said chip in alignment with said plurality of cells within said given pitch, and a pull-down circuit coupled to the other end of said drive line, responsive to said drive pulse and formed within said chip in alignment with said cells and within said given pitch to establish said pull-down circuit in a first state and means for applying a restore pulse at predetermined periodic intervals to said pull-down circuit to switch said pull-down circuit to a second state.

12. A memory accessing system as set forth in claim 11 wherein said drive line is a word line and said pull-down circuit includes a latch responsive to said drive pulse to set said latch in the first state.

13. A memory accessing system as set forth in claim 12 wherein said cells each include a capacitor and a field effect transistor having a gate connected to said word line and said latch includes first and second field effect transistors, the gate of said first transistor being connected to the other end of said word line and the gate of said second transistor being connected to said restore pulse applying means.

14. A memory accessing system as set forth in claim 13 wherein said means for applying a drive pulse to said word line includes a transistor having a gate connected to said decode circuit.

15. A memory accessing system comprising a plurality of memory cells each including a capacitor and a field effect transistor having a gate coupled to a word drive line, a decode circuit coupled to one end of said drive line and means for applying a drive pulse to said one end of said word line, and a pull-down circuit connected to the other end of said word line, said pull-down circuit including a latch responsive to said drive pulse to set said latch in a first state, and means for applying a restore pulse at predetermined periodic intervals to said latch to set said latch in a second state.

16. A memory accessing system as set forth in claim 15 wherein said latch includes first and second field effect transistors, the gate of said first transistor being connected to the other end of said word line and the gate of said second transistor being connected to said restore pulse applying means.

* * * * *